United States Patent
Fu et al.

(10) Patent No.: US 12,199,772 B2
(45) Date of Patent: Jan. 14, 2025

(54) METHOD FOR WIRELESS COMMUNICATION, TERMINAL DEVICE, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventors: Zhe Fu, Guangdong (CN); Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 486 days.

(21) Appl. No.: 17/565,704

(22) Filed: Dec. 30, 2021

(65) Prior Publication Data
US 2022/0123873 A1      Apr. 21, 2022

Related U.S. Application Data

(63) Continuation of application No. PCT/CN2019/100671, filed on Aug. 14, 2019.

(51) Int. Cl.
*H04L 1/1812* (2023.01)
*H04L 1/1829* (2023.01)
*H04W 72/23* (2023.01)

(52) U.S. Cl.
CPC .......... *H04L 1/1812* (2013.01); *H04L 1/1854* (2013.01); *H04W 72/23* (2023.01)

(58) Field of Classification Search
None
See application file for complete search history.

(56) References Cited

U.S. PATENT DOCUMENTS

2014/0286258 A1*  9/2014  Chowdhury ............ H04L 69/16
                                                                    370/329
2019/0215907 A1    7/2019  Phuyal et al.
(Continued)

FOREIGN PATENT DOCUMENTS

| CN | 102171962 | 8/2011 |
| CN | 108811175 | 11/2018 |

(Continued)

OTHER PUBLICATIONS

LG Electronics Inc., "UL data prioritization for the DG/CG conflict and the CG/CG conflict," 3GPP TSG-RAN WG2 Meeting #105bis, R2-1905016, Apr. 2019.
(Continued)

*Primary Examiner* — Chi H Pham
*Assistant Examiner* — Raul Rivas
(74) *Attorney, Agent, or Firm* — Hodgson Russ LLP (57) ABSTRACT

A method for wireless communication, a terminal device, and a non-transitory computer-readable storage medium are provided. The method includes receiving, by a terminal device, retransmission scheduling of a first hybrid automatic repeat request (HARQ) process performed by a network device, and processing, by the terminal device, deprioritized data according to first information. The deprioritized data corresponds to the first HARQ process, and the first information includes at least one of: whether the deprioritized data is assembled before the retransmission scheduling is received, or whether the deprioritized data is delivered to the first HARQ process before the retransmission scheduling is received.

18 Claims, 4 Drawing Sheets

200

Receive, by a terminal device, retransmission scheduling of a first hybrid automatic repeat request (HARQ) process performed by a network device — S210

Process, by the terminal device, deprioritized data according to first information, where the deprioritized data corresponds to the first HARQ process, and the first information includes at least one of: whether the deprioritized data is assembled before the retransmission scheduling is received; or whether the deprioritized data is delivered to the first HARQ process before the retransmission scheduling is received — S220

(56) References Cited

U.S. PATENT DOCUMENTS

2019/0245657 A1     8/2019     Lee et al.
2022/0078768 A1*    3/2022     El Hamss ............. H04L 5/0055

FOREIGN PATENT DOCUMENTS

| | | |
|---|---|---|
| CN | 109729596 | 5/2019 |
| WO | 2018231978 | 12/2018 |
| WO | 2019098663 | 5/2019 |
| WO | 2019139361 | 7/2019 |
| WO | 2021026847 | 2/2021 |

OTHER PUBLICATIONS

Huawei et al., "Prioritization between SR and Pusch," 3GPP TSG-RAN WG2 Meeting#106, R2-1906506 (Revision of R2-1903369), May 2019.

EPO, Extended European Search Report for EP Application No. 19941018.4, May 27, 2022.

Huawei et al., "Further discussion on transmission of de-prioritized data due to intra-UE prioritization," 3GPP TSG-RAN WG2 Meeting#106, R2-1906507 (Revision of R2-1903370), May 2019.

Huawei et al., "Prioritization between configured and dynamic grants, " 3GPP TSG-RAN WG2 Meeting#106, R2-1906505 (Revision of R2-1903368), May 2019.

Interdigital, "Resource Conflicts for Data-only Intra-UE Prioritization," 3GPP RAN WG2 Meeting #106, R2-1906407 (Revision of R2-1903555), May 2019.

WIPO, International Search Report for PCT/CN2019/100671, May 6, 2020.

CNIPA, First Office Action for CN Application No. 201980092607. 8, Dec. 22, 2022 .

EPO, Communication for EP Application No. 19941018.4, May 26, 2023.

\* cited by examiner

Receive, by a terminal device, retransmission scheduling of a first hybrid automatic repeat request (HARQ) process performed by a network device — S210

Process, by the terminal device, deprioritized data according to first information, where the deprioritized data corresponds to the first HARQ process, and the first information includes at least one of: whether the deprioritized data is assembled before the retransmission scheduling is received; or whether the deprioritized data is delivered to the first HARQ process before the retransmission scheduling is received — S220

METHOD FOR WIRELESS COMMUNICATION, TERMINAL DEVICE, AND NON-TRANSITORY COMPUTER-READABLE STORAGE MEDIUM

CROSS-REFERENCE TO RELATED APPLICATION(S)

This application is a continuation of International Application No. PCT/CN2019/100671, filed on Aug. 14, 2019, the entire disclosure of which is incorporated herein by reference.

TECHNICAL FIELD

Implementations of the present disclosure relates to the communication field, and in particular, to a method for wireless communication, a terminal device, and a non-transitory computer-readable storage medium.

BACKGROUND

In a new radio (NR) system, it is necessary to support transmission of multiple services, such as factory automation services, transport industry services, smart power services and so on. In this way, resources configured for a same terminal may conflict in the time domain. For example, after a base station schedules and transmits an enhanced mobile broadband (eMBB) service on an uplink (UL) grant, the base station schedules and transmits an ultra-reliable and low latency communication (URLLC) service on another UL grant, if the two UL grants overlap in the time domain, the service on only one UL grant is transmitted, where the service can be called a prioritized service or prioritized data, and the transmission can be called prioritized transmission. Correspondingly, the service on another UL grant can be called deprioritized service or deprioritized data. Therefore, how to perform retransmission scheduling on the deprioritized data to avoid data loss is an urgent problem to be solved.

SUMMARY

Implementations of the present disclosure provide a method for wireless communication, a terminal device, and a non-transitory computer-readable storage medium.

According to a first aspect, a method for wireless communication is provided. The method includes receiving, by a terminal device, retransmission scheduling of a first hybrid automatic repeat request (HARQ) process performed by a network device, and processing, by the terminal device, deprioritized data according to first information. The deprioritized data corresponds to the first HARQ process, and the first information includes at least one of: whether the deprioritized data is assembled before the retransmission scheduling is received, or whether the deprioritized data is delivered to the first HARQ process before the retransmission scheduling is received.

According to a second aspect, a terminal device is provided. The terminal device includes a transceiver, a processor, and a memory storing a computer program which, when executed by the processor, causes the transceiver to receive retransmission scheduling of a first HARQ process performed by a network device. The computer program, when executed by the processor, further causes the processor to process deprioritized data according to first information. The deprioritized data corresponds to the first HARQ process, and the first information includes at least one of: whether the deprioritized data is assembled before the retransmission scheduling is received, or whether the deprioritized data is delivered to the first HARQ process before the retransmission scheduling is received.

According to a third aspect, a non-transitory computer-readable storage medium configured to store one or more programs comprising instructions which cause a terminal device to receive retransmission scheduling of a first HARQ process performed by a network device, and process deprioritized data according to first information. The deprioritized data corresponds to the first HARQ process, and the first information includes at least one of: whether the deprioritized data is assembled before the retransmission scheduling is received, or whether the deprioritized data is delivered to the first HARQ process before the retransmission scheduling is received.

DETAILED DESCRIPTION

The technical solutions in implementations of the present disclosure will be illustrated in the following with reference to accompanying drawings in the implementations of the present disclosure. Apparently, the described implementations are merely a part of rather than all the implementations of the present disclosure. Based on the implementations of the present disclosure, all other implementations obtained by those of ordinary skill in the art without creative efforts are within the scope of protection of the present disclosure.

The technical solutions in the implementations of the present disclosure can be applied to various communication systems, such as a global system of mobile communication (GSM), a code division multiple access (CDMA) system, and a wideband code division multiple access (WCDMA) system, a general packet radio service (GPRS), a long term evolution (LTE) system, an LTE frequency division duplex (FDD) system, an LTE time division duplex (TDD), a universal mobile telecommunication system (UMTS), a worldwide interoperability for microwave access (WiMAX) communication system or a fifth generation (5G) system, etc.

Figure 1:
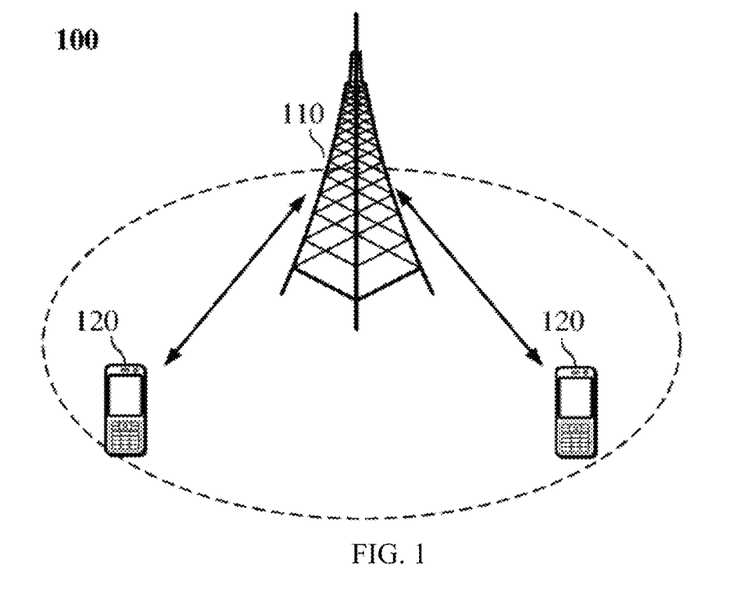
FIG. 1 is a schematic diagram illustrating an application scenario provided in implementations of the present disclosure.

Exemplarily, a communication system 100 applied in the implementations of the present disclosure is illustrated in FIG. 1. The communication system 100 may include a network device 110. The network device 110 may be a device that can communicate with a terminal device 120 (also referred to as "communication terminal" or "terminal"). The network device 110 can provide a communication coverage for a specific geographical area and communicate with terminal devices in the coverage area. Alternatively, the network device 110 may be a base transceiver station (BTS) in the GSM or in the CDMA system, or may be a NodeB (NB) in the WCDMA system, or may be an evolutional Node B (eNB or eNodeB) in the LTE system, or a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future evolved public land mobile network (PLMN).

The communication system 100 further includes at least one terminal device 120 located in the coverage area of the network device 110. The "terminal device" referred to herein can include but is not limited to a device configured to communicate via a wired line, another data connection/network, and/or a wireless interface, and/or a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", and/or a "mobile terminal". Examples of a mobile terminal may include, but are not limited to, a satellite telephone or cellular telephone, a personal communication system (PCS) terminal integrated with functions of cellular radio telephone, data processing, fax, and data communication, a personal digital assistant (PDA) equipped with radio telephone, pager, Internet/Intranet access, web browser, notebook, calendar, and/or global positioning system (GPS) receiver, and a conventional laptop and/or handheld receiver, or other electronic devices equipped with a radio telephone receiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved PLMN, etc.

Alternatively, terminal devices 120 can communicate with each other through device to device (D2D) communication.

Alternatively, the 5G system or 5G network can also be referred to as a new radio (NR) system or an NR network.

FIG. 1 exemplarily illustrates one network device and two terminal devices. Alternatively, the communication system 100 may also include multiple network devices, and there can be other numbers of terminal devices in a coverage area of each network device, which is not limited herein.

Alternatively, the communication system 100 may further include other network entities such as a network controller, a mobile management entity (MME), or the like, and the present disclosure is not limited in this regard.

It is to be understood that a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be repeated herein. The communication device may further include other devices such as a network controller, an MME, or other network entities in the communication system 100, the present disclosure is not limited in this regard.

It can be understood that the terms "system" and "network" in this specification are often used interchangeably. The term "and/or" in this specification only illustrates an association relationship of associated objects, which means that there can be three types of relationships, for example, A and/or B can mean: A alone exists, A and B exist at the same time, and B exists alone. In addition, the character "/" in this specification generally indicates that the associated objects before and after "/" are in an "or" relationship.

Figure 2:
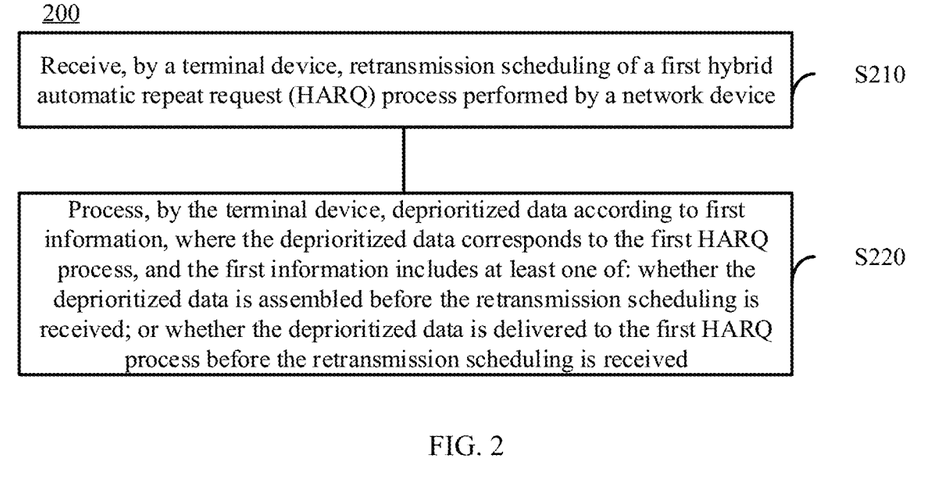
FIG. 2 is a schematic diagram illustrating a method for wireless communication provided in implementations of the present disclosure.

FIG. 2 is a schematic flow chart illustrating a method 200 for wireless communication provided in implementations of the present disclosure. The method 200 can be performed by the terminal device in the communication system illustrated in FIG. 1. As illustrated in FIG. 2, the method 200 includes at least part of the following.

At S210, the terminal device receives retransmission scheduling of a first hybrid automatic repeat request (HARQ) process performed by the network device.

At S220, the terminal device processes deprioritized data according to first information, where the deprioritized data corresponds to the first HARQ process, and the first information includes at least one of: whether the deprioritized data is assembled before the retransmission scheduling is received; or whether the deprioritized data is delivered to the first HARQ process before the retransmission scheduling is received.

It can be understood that in the implementations of the present disclosure the deprioritized data is generated under resource conflicts. For example, when a first uplink resource conflicts with a second uplink resource, if only data on the second uplink resource is transmitted, the data carried on the second uplink resource can be called prioritized data, and prioritized data assembled can also be called a prioritized medium access control (MAC) protocol data unit (PDU), and untransmitted data that is carried on or can be carried on the first uplink resource can be called deprioritized data, and deprioritized data assembled can also be called a deprioritized MAC PDU.

It can be understood that in the implementations of the present disclosure, deprioritized data may also be referred to as low-priority data or a low-priority MAC PDU.

It can be noted that in the implementations of the present disclosure, the deprioritized data being corresponding to the first HARQ process may be that the deprioritized data is transmitted on the first HARQ process, or the deprioritized data is transmitted using the first HARQ process.

It can also be noted that in the implementations of the present disclosure, the deprioritized data corresponding to the first HARQ process may be the deprioritized data transmitted on the first HARQ process, or the deprioritized data transmitted using the first HARQ process.

Alternatively, the first uplink resource and the second uplink resource conflicting may mean that the first uplink resource and the second uplink resource at least partially overlap in the time domain. For example, the start time of the first uplink resource and the start time of the second uplink resource may be the same, and the end time of the first uplink resource and the end time of the second uplink resource may be different. Alternatively, the start time of the first uplink resource and the start time of the second uplink resource may be different, and the end time of the first uplink resource and the end time of the second uplink resource may be the same. Alternatively, the start time of the first uplink resource and the start time of the second uplink resource may be different, the end time of the first uplink resource and the end time of the second uplink resource may be different, and the middle of the first uplink resource and the middle of the second uplink resource may overlap. Alternatively, the start time of the first uplink resource and the start time of the second uplink resource may be the same, and the end time of the first uplink resource and the end time of the second uplink resource may be the same. The implementations of the present disclosure is not limited in this regard.

Alternatively, the first uplink resource may be an uplink resource such as a configured grant (CG) resource, a dynamic grant (DG) resource, an uplink grant of an uplink shared channel (UL-SCH), or an uplink grant of uplink control information (UCI), which is not limited in the implementations of the present disclosure.

Alternatively, the second uplink resource may be an uplink resource such as a CG resource, a DG resource, an uplink grant of a UL-SCH, or an uplink grant of UCI, which is not limited in the implementations of the present disclosure. The following takes a conflict between the CG resource and the DG resource as an example for illustration, but the present disclosure is not limited thereto.

In the implementations of the present disclosure, the CG resource is a semi-persistently scheduled resource. After the network device configures the CG resource for the terminal device, the CG resource (for example, for Type-1 CG resource (Type-1 CG)) is activated (i.e., configuring means activating), or the network device can further activate the CG resource (for example, for Type-2 CG resource (Type-2 CG)) via dynamic signaling such as DCI. After the CG resource is activated, the terminal device can use the CG resource to perform transmission. The CG resource may be a periodic resource. The terminal device can use the CG resource multiple times to perform transmission.

In the implementations of the present disclosure, the DG resource is a dynamically scheduled resource. After the network device configures the DG resource for the terminal device, the terminal device can use the DG resource to perform transmission. The DG resource is generally a resource for single use. After the network device configures the DG resource, the terminal device generally can use the DG resource to perform only a single transmission.

Alternatively, in the implementations of the present disclosure, in the case of a resource conflict, the terminal device may not assemble the deprioritized data (denoted as Implementation 1) or may also assemble the deprioritized data (denoted as Implementation 2). Further, in the case of receiving the retransmission scheduling of the HARQ process corresponding to the deprioritized data performed by the network device, the terminal device can process the deprioritized data according to whether the deprioritized data corresponding to the HARQ process is assembled. For example, if the deprioritized data is not assembled, the terminal device can assemble the deprioritized data, and further transmit the deprioritized data assembled, for example, perform new transmission of the deprioritized data assembled. For another example, if the deprioritized data is assembled, the terminal device can transmit the deprioritized data assembled, for example, perform new transmission of the deprioritized data or retransmit the deprioritized data.

Hereinafter, the mode in which the deprioritized data is transmitted will be described in detail in combination with Implementation 1 and Implementation 2.

Implementation 1

The terminal device determines to transmit second data on a second grant resource. If the terminal device receives a first grant resource scheduled by the network device before the second grant resource, the first grant resource is used to transmit first data. If there is a conflict between the first grant resource and the second grant resource, the terminal device may not assemble the first data, and only transmit the second data during transmission, accordingly the second data is prioritized data, and the first data is deprioritized data. The first grant resource corresponds to the first HARQ process, and the second grant resource corresponds to a second HARQ process.

Herein, the first grant resource and the second grant resource may correspond to the first uplink resource and the second uplink resource described above, respectively, and for detailed implementation, reference can be made to the detailed implementation described above, which will not be repeated herein.

As an example, the terminal device may not assemble the deprioritized data under any conditions. As another example, the terminal device may not assemble the deprioritized data under specific conditions.

For example, the terminal device can determine whether to assemble the prioritized data according to at least one of: whether the prioritized data is assembled, transmission status of the prioritized data, a priority of the prioritized data, a priority of the second grant resource, a priority of the deprioritized data, or a priority of the first grant resource.

It can be understood that the prioritized data herein is prioritized data corresponding to the deprioritized data. The prioritized data corresponding to the deprioritized data is data that is preferentially transmitted when a resource conflict occurs, and the deprioritized data is data that is not transmitted due to the resource conflict.

Alternatively, the transmission status of the prioritized data may include whether the prioritized data is transmitted to a physical layer and/or whether the prioritized data is transmitted (or whether the prioritized data is transmitted through an air interface).

As an example, if the prioritized data is transmitted to the physical layer or assembled before a first time point, the terminal device may not assemble the deprioritized data.

As an example, if the prioritized data is assembled before the first time point, and the priority of the deprioritized data is lower than the priority of the prioritized data, or the priority of the deprioritized data is lower than a first priority threshold, the terminal device may not assemble the deprioritized data.

As another example, if the prioritized data is assembled before the first time point, and the priority of the first grant resource is lower than the priority of the second grant resource, or the priority of the first grant resource is lower than a second priority threshold, the terminal device may not assemble the deprioritized data.

As an example, if the prioritized data is transmitted to the physical layer before the first time point, and the priority of the deprioritized data is lower than the priority of the prioritized data, or the priority of the deprioritized data is lower than the first priority threshold, the terminal device may not assemble the deprioritized data.

As another example, if the prioritized data is transmitted to the physical layer before the first time point, and the priority of the first grant resource is lower than the priority of the second grant resource, or the priority of the first grant resource is lower than the second priority threshold, the terminal device may not assemble the deprioritized data.

As an example, if the prioritized data is transmitted before the first time point, and the priority of the deprioritized data is lower than the priority of the prioritized data, or the priority of the deprioritized data is lower than the first priority threshold, the terminal device may not assemble the deprioritized data.

As another example, if the prioritized data is transmitted before the first time point, and the priority of the first grant resource is lower than the priority of the second grant resource, or the priority of the first grant resource is lower than the second priority threshold, the terminal device may not assemble the deprioritized data.

As an example, if a scheduling request (SR) is transmitted to the physical layer before the first time point, and the priority of the deprioritized data is lower than the priority of the SR, or the priority of the deprioritized data is lower than the first priority threshold, the terminal device may not assemble the deprioritized data.

As another example, if the SR is transmitted to the physical layer before the first time point, and the priority of the first grant resource is lower than a priority of a grant resource for the SR, or the priority of the first grant resource is lower than the second priority threshold, the terminal device may not assemble the deprioritized data.

As another example, if the SR is transmitted before the first time point, and the priority of the deprioritized data is lower than the priority of the SR, or the priority of the deprioritized data is lower than the first priority threshold, the terminal device may not assemble the deprioritized data.

As another example, if the SR is transmitted before the first time point, and the priority of the first grant resource is lower than the priority of the grant resource for the SR, or the priority of the first grant resource is lower than the second priority threshold, the terminal device may not assemble the deprioritized data.

Alternatively, in some implementations, the first priority threshold may be predefined or configured by the network device.

Alternatively, in some implementations, the second priority threshold may be predefined or configured by the network device.

It is to be noted that "before the first time point" may refer to one of the following: before the terminal device acquires the first grant resource for the deprioritized data, for example, before the terminal device receives the first grant resource configured by the network device; or before the first grant resource for the deprioritized data is available, and before a start time-domain position of the first grant resource; or before there is to-be-transmitted data on the first grant resource for the deprioritized data, or before there is data that can be carried on the first grant resource for the deprioritized data.

Certainly, if the priority of the first grant resource is higher than the priority of the second grant resource, or a priority of data that can be carried on the first grant resource is higher than that of data that can be carried on the second grant resource, the first grant resource may not be assembled.

It is to be understood that in implementations of the present disclosure, when there is data that can be carried on the first grant resource, skipping assembling the first grant resource may include skipping assembling the data on the first grant resource, i.e., skipping assembling the deprioritized data, where the two have the same meaning and can be replaced with each other.

Correspondingly, when there is data that can be carried on the first grant resource, assembling the first grant resource may include assembling the data on the first grant resource, i.e., assembling the deprioritized data, where the two have the same meaning and can be replaced with each other.

It can be understood that in implementations of the present disclosure, whether to assemble the deprioritized data may include whether to assemble deprioritized resource (i.e., the first grant resource).

Further, in the case of not (skipping) assembling the deprioritized data, an MAC layer of the terminal device may not deliver information of the first grant resource to the first HARQ process, and/or may not instruct the physical layer to use the first grant resource to transmit data.

Further, if the terminal device receives the retransmission scheduling of the first HARQ process performed by the network device, the terminal device can transmit the deprioritized data according to whether the deprioritized data corresponding to the first HARQ process is assembled before the retransmission scheduling is received.

For example, if the deprioritized data corresponding to the first HARQ process is not assembled before the retransmission scheduling is received, the terminal device may assemble the deprioritized data, and further transmit the deprioritized data assembled (i.e., deprioritized MAC PDU), for example, perform new transmission of the deprioritized MAC PDU.

In some cases, the deprioritized data corresponding to the first HARQ process being not assembled may be understood as that a buffer of the first HARQ process is empty.

Alternatively, in implementations of the present disclosure, the terminal device can receive a physical downlink control channel (PDCCH) transmitted by the network device. The PDCCH may include information of an uplink grant scheduled by the network device. The uplink grant corresponds to the first HARQ process. The terminal device can determine whether the scheduling of the first HARQ process performed by the network device is retransmission scheduling or initial-transmission scheduling according to a radio network temporary identifier (RNTI) for scrambling the PDCCH and/or a new data indicator (NDI) in the PDCCH.

For example, if the PDCCH is scrambled by a configured scheduling-RNTI (CS-RNTI), and the NDI is 1, it can be determined that the scheduling of the first HARQ process is the retransmission scheduling.

For another example, if the PDCCH is scrambled by the CS-RNTI, it can be determined that the scheduling of the first HARQ process is the retransmission scheduling.

For another example, if the PDCCH is scrambled by a cell-RNTI (C-RNTI), and the NDI is not inverted, it can be determined that the scheduling of the first HARQ process is the retransmission scheduling.

For another example, if the PDCCH is scrambled by the C-RNTI, and the corresponding HARQ process is empty, it can be determined that the scheduling of the first HARQ process is the retransmission scheduling.

For another example, if the PDCCH is scrambled by the C-RNTI, and the corresponding HARQ process is an HARQ process for a resource that is not used due to a resource conflict, it can be determined that the scheduling of the first HARQ process is the retransmission scheduling.

For another example, if the PDCCH is scrambled by the C-RNTI, and the corresponding HARQ process is an HARQ process corresponding to the deprioritized data, it can be determined that the scheduling of the first HARQ process is the retransmission scheduling.

Alternatively, in the implementations of the present disclosure, the terminal device determines whether the deprioritized data is assembled according to whether the deprioritized data is stored in the first HARQ process or whether the grant resource for the deprioritized data is used.

For example, if the buffer of the first HARQ process is empty, it can be determined that the deprioritized data is not assembled.

For another example, if the deprioritized data is not stored in the buffer of the first HARQ process, it can be determined that the deprioritized data is not assembled.

For another example, if the first grant resource is not used before the retransmission scheduling is received, it can be determined that the deprioritized data is not assembled.

Alternatively, the first grant resource being not used may include that the first grant resource is ignored, or there is no data transmission on the first grant resource, or a grant resource in a resource conflict scenario, i.e., the first grant resource may not be used due to a resource conflict between the first grant resource and other grant resources.

Correspondingly, if the buffer of the first HARQ is not empty, it can be determined that the deprioritized data is assembled. Alternatively, if the deprioritized data is stored in the buffer of the first HARQ process, it can be determined that the deprioritized data is assembled. Alternatively, if the first grant resource is used before the scheduling retransmission is received, it can be determined that the deprioritized data is assembled.

Further, if the retransmission scheduling of the first HARQ process is received, and the deprioritized data is not assembled, the terminal device can assemble the deprioritized data and transmit the deprioritized data assembled.

In some cases, the deprioritized data being not assembled can be understood as that the buffer of the first HARQ process is empty.

Specifically, the terminal device assembling the deprioritized data can include that a multiplexing and assembly entity of the terminal device assembles the deprioritized data and obtains the deprioritized MAC PDU, for example, adds a header to the deprioritized data.

Further, the terminal device transmitting the deprioritized data assembled may include at least one of the following: the MAC layer of the terminal device acquires the deprioritized MAC PDU from the multiplexing and assembly entity; the MAC layer of the terminal device delivers to the first HARQ process at least one of the deprioritized MAC PDU, the uplink grant for the retransmission scheduling, or HARQ information for the uplink grant (for example, redundancy version, RV). After the deprioritized MAC PDU is delivered to the first HARQ process, the MAC layer of the terminal device instructs the first HARQ process to trigger new transmission, further, uses the first HARQ process to perform new transmission of the deprioritized MAC PDU.

In some implementations, if the uplink grant for the retransmission scheduling is a CG resource, i.e., the first HARQ process is an HARQ process for the CG resource, or the uplink grant for the retransmission scheduling is a DG resource and the first HARQ process is an HARQ process for a corresponding CG resource, the terminal device can further start or restart a configured grant timer for the first HARQ process in response to starting to transmit the deprioritized MAC PDU. During running of the configured grant timer, the deprioritized MAC PDU stored in the first HARQ process is not flushed, which is conducive to preventing loss of the deprioritized data.

Therefore, in Implementation 1, when the terminal device receives the retransmission scheduling of the HARQ process corresponding to the deprioritized data performed by the network device, the terminal device assembles the deprioritized data that is not assembled, and performs new transmission of the deprioritized data assembled, which is helpful to reduce the waste of resources scheduled by the network device, and transmit data to be transmitted in the terminal device to the network device as soon as possible, therefore, it is conducive to meeting transmission requirements of services with high delay requirements, thereby improving user experience.

Implementation 2

The terminal device determines to transmit second data on a second grant resource. If the terminal device receives a first grant resource scheduled by the network device before the second grant resource, the first grant resource is used to transmit first data. If there is a conflict between the first grant resource and the second grant resource, the terminal device may assemble the first data, and only transmit the second data during transmission, accordingly the second data is prioritized data, and the first data is deprioritized data. The first grant resource corresponds to a first HARQ process, and the second grant resource corresponds to a second HARQ process.

Herein, for detailed implementation of the first grant resource and the second grant resource, reference can be made to the detailed implementation described above, which is not repeated herein.

As an example, the terminal device may assemble the deprioritized data under any conditions. As another example, the terminal device may assemble the deprioritized data under specific conditions.

For example, the terminal device can determine whether to assemble the prioritized data according to at least one of: whether the prioritized data is assembled, transmission status of the prioritized data, a priority of the prioritized data, a priority of the second grant resource, a priority of the deprioritized data, or a priority of the first grant resource.

Alternatively, the transmission status of the prioritized data may include whether the prioritized data is transmitted to the physical layer and/or whether the prioritized data is transmitted (or whether the prioritized data is transmitted through the air interface).

As an example, if the prioritized data is assembled before a second time point, and the priority of the deprioritized data is lower than the priority of the prioritized data, or the priority of the deprioritized data is lower than a first priority threshold, the terminal device may assemble the deprioritized data.

As another example, if the prioritized data is assembled before the second time point, and the priority of the first grant resource is lower than the priority of the second grant resource, or the priority of the first grant resource is lower than a second priority threshold, the terminal device may assemble the deprioritized data.

As an example, if the prioritized data is transmitted to a physical layer before the second time point, and the priority of the deprioritized data is lower than the priority of the prioritized data, or the priority of the deprioritized data is lower than the first priority threshold, the terminal device may assemble the deprioritized data.

As another example, if the prioritized data is transmitted to the physical layer before the second time point, and the priority of the first grant resource is lower than the priority of the second grant resource, or the priority of the first grant resource is lower than a second priority threshold, the terminal device may assemble the deprioritized data.

As an example, if the prioritized data is transmitted before the second time point, and the priority of the deprioritized data is lower than the priority of the prioritized data, or the priority of the deprioritized data is lower than the first priority threshold, the terminal device may assemble the deprioritized data.

As another example, if the prioritized data is transmitted before the second time point, and the priority of the first grant resource is lower than the priority of the second grant resource, or the priority of the first grant resource is lower than the second priority threshold, the terminal device may assemble the deprioritized data.

As an example, if an SR is transmitted to the physical layer before the second time point, and the priority of the deprioritized data is lower than the priority of the SR, or the priority of the deprioritized data is lower than the first priority threshold, the terminal device may assemble the deprioritized data.

As another example, if the SR is transmitted to the physical layer before the second time point, and the priority of the first grant resource is lower than the priority of the grant resource for the SR, or the priority of the first grant resource is lower than the second priority threshold, the terminal device may assemble the deprioritized data.

As another example, if the SR is transmitted before the second time point, and the priority of the deprioritized data is lower than the priority of the SR, or the priority of the deprioritized data is lower than the first priority threshold, the terminal device may assemble the deprioritized data.

As another example, if the SR is transmitted before the second time point, and the priority of the first grant resource is lower than the priority of the grant resource for the SR, or the priority of the first grant resource is lower than the second priority threshold, the terminal device may assemble the deprioritized data.

Alternatively, in some implementations, the terminal device can assemble the deprioritized data if the prioritized data is assembled, or is transmitted to the physical layer, or is transmitted, and/or, the priority of the deprioritized data is higher than the priority of the prioritized data, or the priority of the deprioritized data is higher than a specified priority threshold.

Alternatively, in some implementations, the terminal device can assemble the deprioritized data if the prioritized data is assembled, or is transmitted to the physical layer, or is transmitted, and/or, the priority of the first grant resource is higher than the priority of the second grant resource, or the priority of the first grant resource is higher than a specified priority threshold.

For example, if the priority of the first grant resource is higher than the priority of the second grant resource, or a priority of data that can be carried on the first grant resource is higher than a priority of data that can be carried on the second grant resource, the first grant resource can be assembled, i.e., the deprioritized data on the first grant resource can be assembled.

For another example, if the prioritized data corresponding to the deprioritized data is transmitted to the physical layer or assembled before the second time point, the terminal device can assemble the deprioritized data.

It is to be noted that in implementations of the present disclosure, "before the second time point" may refer to one of the following: before the terminal device acquires the first grant resource for the deprioritized data, for example, before the terminal device receives the first grant resource configured by the network device; or before the first grant resource for the deprioritized data is available; or before there is to-be-transmitted data on the first grant resource for the deprioritized data, or before there is data that can be carried on the first grant resource for the deprioritized data.

It can be understood that in implementations of the present disclosure, whether to assemble the deprioritized data may include whether to assemble deprioritized resource (i.e., the first grant resource).

Further, in the case of assembling the deprioritized data, the MAC layer of the terminal device may deliver the information of the first grant resource to the first HARQ process, and/or may not instruct the physical layer to use the first grant resource to transmit data, i.e., may not transmit the deprioritized data.

Further, the terminal device receives the retransmission scheduling of the first HARQ process performed by the network device. It can be understood that in Implementation 2, for a manner in which the network device determines that the scheduling of the first HAQR process is the retransmission scheduling, reference can be made to related illustration in Implementation 1, which will not be repeated herein.

Alternatively, in Implementation 2, the terminal device can determine whether the deprioritized data is assembled according to whether the deprioritized data is stored in the first HARQ process or whether the grant resource for the deprioritized data is used.

For example, if the deprioritized data is not stored in a buffer of the first HARQ process, it can be determined that the deprioritized data is not assembled.

For another example, if the first grant resource is not used before the retransmission scheduling is received, it can be determined that the deprioritized data is not assembled.

For example, if the buffer of the first HARQ process is empty, it can be determined that the deprioritized data is not assembled.

For another example, if the buffer of the first HARQ process is empty, and the first grant resource is not used before the retransmission scheduling is received, it can be determined that the deprioritized data is not assembled.

Alternatively, the first grant resource being not used may include that the first grant resource is ignored, or there is no data transmission on the first grant resource, or a grant resource in a resource conflict scenario, i.e., the first grant resource may not be used due to a resource conflict between the first grant resource and other grant resources.

Correspondingly, if the deprioritized data is stored in the buffer of the first HARQ, it can be determined that the deprioritized data is assembled. Alternatively, if the first grant resource is used before the retransmission scheduling is received, it can be determined that the deprioritized data is assembled. Alternatively, if the buffer of the first HARQ process is not empty and the first grant resource is used before the retransmission scheduling is received, it can be determined that the deprioritized data is assembled. Alternatively, if the buffer of the first HAQR process is not empty, it can be determined that the deprioritized data is assembled.

Further, if the retransmission scheduling of the first HARQ process is received and the deprioritized data is assembled, the terminal device can transmit the deprioritized data assembled.

Specifically, the terminal device can transmit the deprioritized data according to whether the deprioritized data assembled is delivered to the first HARQ process before the retransmission scheduling is received, for example, perform new transmission of the deprioritized data or retransmit the deprioritized data.

For example, if the deprioritized data assembled (i.e., deprioritized MAC PDU) is not delivered to or not stored in the first HARQ process before the retransmission scheduling is received, the terminal device can perform new transmission of the deprioritized MAC PDU.

For example, if the deprioritized data assembled (i.e., deprioritized MAC PDU) is delivered to or stored in the first HARQ process before the retransmission scheduling is received, the terminal device can retransmit the deprioritized MAC PDU.

In some implementations, if the deprioritized data is assembled, it can be deemed that the deprioritized data is transmitted to the first HARQ process. In this case, the terminal device can perform new transmission of the deprioritized data in the first HAQR process or retransmit the deprioritized data in the first HAQR process, and it is not necessary to determine whether the deprioritized data is transmitted to the first HARQ process.

In implementations, the terminal device performing new transmission of the deprioritized data may include at least one of the following: an MAC layer of the terminal device can acquire the deprioritized MAC PDU from a multiplexing and assembly entity, and further, the MAC layer of the terminal device can deliver to the first HARQ process at least one of the deprioritized MAC PDU, an uplink grant for the retransmission scheduling, or HARQ information for the uplink grant. If the deprioritized MAC PDU is delivered to the first HARQ process, the MAC layer of the terminal device can instruct the first HARQ process to trigger new transmission, and further, can use the first HARQ process to perform new transmission of the deprioritized MAC PDU.

In implementations, the terminal device retransmitting the deprioritized data may include at least one of the following: the MAC layer of the terminal device can deliver to the first HARQ process at least one of the uplink grant for the retransmission scheduling and the HARQ information for the uplink grant. Further, the MAC layer of the terminal device can instruct the first HARQ process to trigger retransmission. Further, the terminal device can use the first HARQ process to retransmit the deprioritized MAC PDU.

In Implementation 2, if the uplink grant for the retransmission scheduling is a CG resource, i.e., the first HARQ process is an HARQ process for the CG resource, or the uplink grant for the retransmission scheduling is a DG resource and the first HARQ process is an HARQ process for a corresponding CG resource, the terminal device can further start or restart the configured grant timer for the first HARQ process in response to starting to transmit the deprioritized MAC PDU. During running of the configured grant timer, the deprioritized MAC PDU stored in the first HARQ process is not flushed, which is conducive to preventing loss of the deprioritized data.

Therefore, in Implementation 2, when the terminal device receives the retransmission scheduling of the HARQ process corresponding to the deprioritized data performed by the network device, the terminal device can perform new transmission of the deprioritized data or retransmit the deprioritized data, which is helpful to reduce the waste of resources scheduled by the network device, and transmit to-be-transmitted data in the terminal device to the network device as soon as possible, therefore, it is conducive to meeting transmission requirements of services with high delay requirements, thereby improving user experience. In addition, the terminal device assembles the deprioritized data before the retransmission scheduling performed by the network device is received, which is beneficial to avoid an assembling delay caused by assembling performed after the retransmission scheduling is received, thereby improving the user experience.

Figure 3:
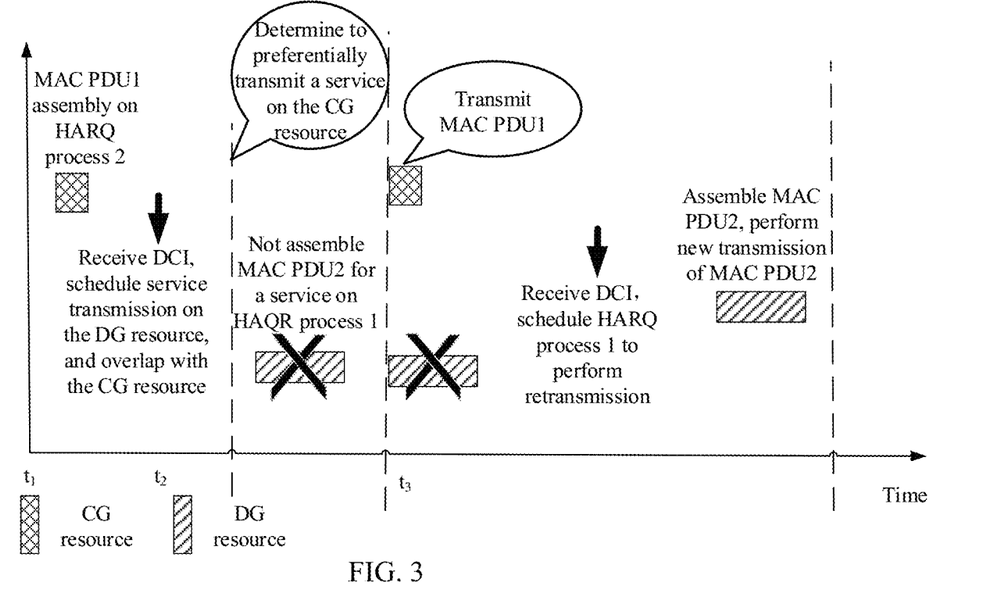
FIG. 3 is a schematic diagram illustrating transmission of deprioritized data according to implementations.
Figure 4:
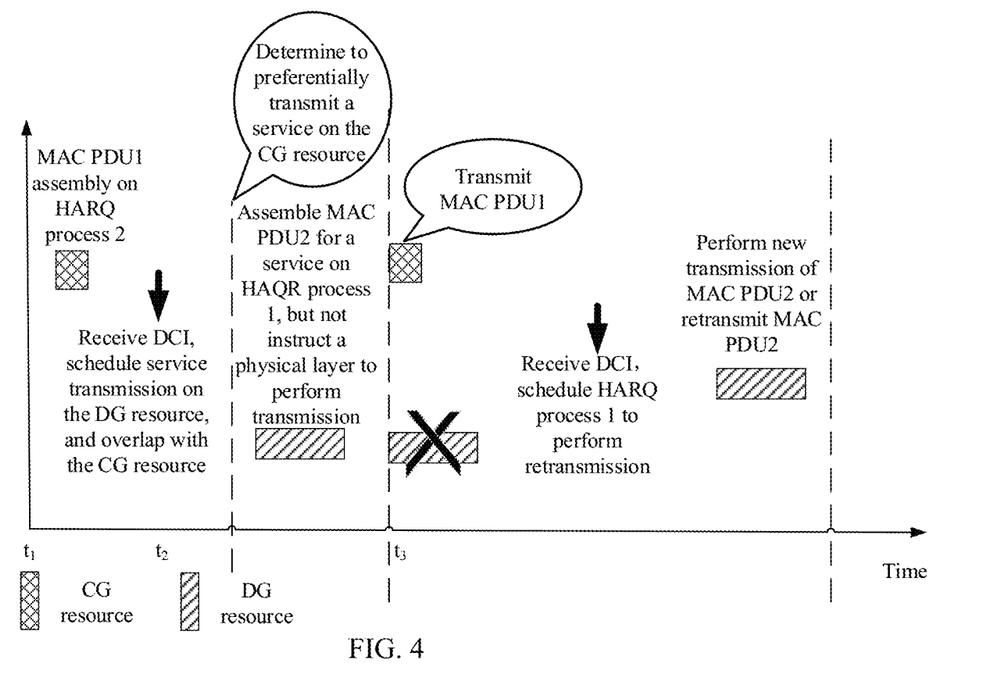
FIG. 4 is a schematic diagram illustrating transmission of deprioritized data according to other implementations.

In combination with implementations illustrated in FIG. 3 and FIG. 4, the following will illustrate methods for wireless communication in implementations of the present disclosure in detail.

In an example illustrated in FIG. 3, the network device can configure a CG resource for the terminal device. Alternatively, configuration information of the CG resource may include at least one of the following: a cycle of the CG resource, for example, 1 slot; an identifier (ID) of the CG resource, for example, the ID may be 1; a configured grant timer (configuredGrantTimer) for an HARQ process for the CG resource, for example, a duration of the timer may be 3, which represents 3 slots or 3 times of the cycle of the CG resource; an HAQR process number for the CG resource, for example, the HARQ process number may be 2, 3, or 4.

Further, the network device can indicate that the CG resource with ID 1 is activated via DCI, then the terminal device can use the CG resource to transmit data.

At time point $t_1$, the terminal device determines that at time point $t_3$ there is a configured and activated CG resource, and the terminal device can assemble to-be-transmitted data at time point $t_1$ and obtains MAC PDU1. Alternatively, MAC PDU1 may include data in a logical channel for a URLLC service, where time point $t_1$ is earlier than time point $t_3$.

Further, at time point $t_2$ after time point $t_1$, the terminal device receives a DG resource scheduled by the network device via DCI. If the DG resource is only used for transmitting a low-priority service such as an eMBB service, the DG resource and the CG resource with ID 1 correspond to different HARQ processes. For example, the DG resource corresponds to HARQ process 1, and the CG resource corresponds to HARQ process 2.

When the DG resource and the CG resource with ID 1 overlap, for example, overlap at time point $t_3$, the terminal device can perform intra-UE prioritization and determine to preferentially transmit data on the DG resource. For example, since MAC PDU1 carries the URLLC service, and the DG resource can only carry a low-priority service, it can be deemed that the CG resource with ID 1 has a higher priority than the DG resource, and MAC PDU1 is preferentially transmitted. The terminal device can perform at least one of the following operations.

1. The terminal device may not assemble to-be-transmitted data on the DG resource, that is, does not generate MAC PDU2. Therefore, MAC PDU2 is not stored in HARQ process 1.

2. The terminal device may not deliver the DG resource to HARQ process 1.

3. The terminal device may not instruct the physical layer to use the DG resource to transmit data.

Subsequently, if the terminal device receives retransmission scheduling of HARQ process 1 performed by the network device, the terminal device can determine whether deprioritized data using HARQ process 1 is assembled, or determine whether there is deprioritized data assembled, and for a specific determination manner, reference can be made to related illustration in the above, which will not be repeated herein.

Further, if the deprioritized data using the HARQ process 1 is not assembled, the terminal device can perform at least one of the following.

1. The multiplexing and assembly entity of the terminal device assemblies the deprioritized data and obtains MAC PDU2.

2. The MAC layer of the terminal device acquires MAC PDU2 from the multiplexing and assembly entity.

3. The MAC layer of the terminal device delivers to HARQ process 1 at least one of MAC PDU2, information of uplink grant for the retransmission scheduling, or HARQ information for the uplink grant.

4. The MAC layer of the terminal device instructs HARQ process 1 to trigger new transmission.

Alternatively, in some implementations, if the deprioritized data is scheduled and transmitted on the CG resource, the terminal device can start or restart the configured grant timer for HARQ process 1 when starting to transmit MAC PDU2.

In an example illustrated in FIG. 4, the network device can configure a CG resource for the terminal device. Alternatively, configuration information of the CG resource may include at least one of the following: a cycle of the CG resource, for example, 1 slot; an ID of the CG resource, for example, the ID may be 1; a configured grant timer for an HARQ process for the CG resource, for example, a duration of the timer may be 3, which represents 3 slots or 3 times of the cycle of the CG resource; an HAQR process number for the CG resource, for example, the HARQ process number may be 2, 3, or 4.

Further, the network device can indicate that the CG resource with ID 1 is activated via DCI, then the terminal device can use the CG resource to transmit data.

At time point $t_1$, the terminal device determines that at time point $t_3$ there is a configured and activated CG resource, and the terminal device can assemble to-be-transmitted data at time point $t_1$ and obtain MAC PDU1. Alternatively, MAC PDU1 may include data in a logical channel for a URLLC service, where time point $t_1$ is earlier than time point $t_3$.

Further, at time point $t_2$ after time point $t_1$, the terminal device receives a DG resource scheduled by the network device via DCI. If the DG resource is only used for transmitting a low-priority service such as an eMBB service, the DG resource and the CG resource with ID 1 correspond to different HARQ processes. For example, the DG resource corresponds to HARQ process 1, and the CG resource corresponds to HARQ process 2.

When the DG resource and the CG resource with ID 1 overlap, for example, overlap at time point $t_3$, the terminal device can perform intra-UE prioritization and determine to preferentially transmit data on the DG resource. For example, since MAC PDU1 carries the URLLC service, and the DG resource can only carry a low-priority service, it can be deemed that the CG resource with ID 1 has a higher priority than the DG resource, and MAC PDU1 is preferentially transmitted. The terminal device can perform at least one of the following operations.

1. The terminal device may assemble to-be-transmitted data on the DG resource, that is, generate MAC PDU2. Therefore, MAC PDU2 is stored in HARQ process 1.

2. The terminal device may deliver the DG resource to HARQ process 1.

3. The terminal device may not instruct the physical layer to use the DG resource to transmit data.

Subsequently, if the terminal device receives retransmission scheduling of HARQ process 1 performed by the network device, the terminal device can determine whether deprioritized data using HARQ process 1 is assembled, or determine whether there is assembled deprioritized data, and for a specific determination manner, reference can be made to related illustration in the above, which will not be repeated herein.

Further, if the deprioritized data using HARQ process 1 is assembled, the terminal device can perform at least one of the following.

1. The MAC layer of the terminal device acquires MAC PDU2 from the multiplexing and assembly entity.

2. The MAC layer of the terminal device delivers to HARQ process 1 at least one of MAC PDU2, information of uplink grant for the retransmission scheduling, or HARQ information for the uplink grant.

3. The MAC layer of the terminal device instructs HARQ process 1 to trigger new transmission.

In other implementations, if the deprioritized data using HARQ process 1 is assembled, the terminal device can perform at least one of the following.

1. The MAC layer of the terminal device delivers to HARQ process 1 at least one of information of the uplink grant for the retransmission scheduling, or the HARQ information for the uplink grant.

2. The MAC layer of the terminal device instructs HARQ process 1 to trigger retransmission.

Alternatively, in some implementations, if the deprioritized data is scheduled and transmitted on the CG resource, the terminal device can start or restart the configured grant timer for HARQ process 1 when starting to transmit MAC PDU2.

The above illustrates the method implementations of the present disclosure in detail in combination with FIGS. 2-4. The following will illustrate device implementations of the present disclosure in detail in combination with FIGS. 5-7. It is to be understood that the device implementations correspond to the method implementations, and for similar illustration, reference can be made to the method implementations.

Figure 5:
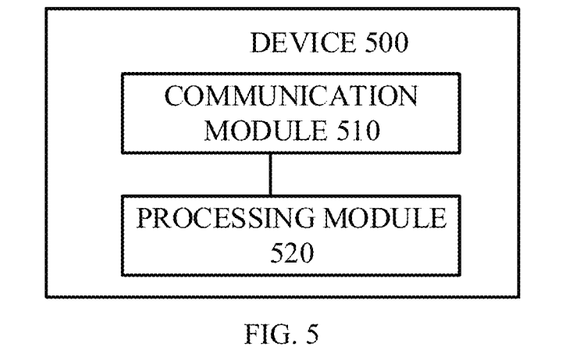
FIG. 5 is a schematic block diagram illustrating a device for wireless communication provided in implementations of the present disclosure.

FIG. 5 is a schematic block diagram illustrating a device 500 for wireless communication according to implementations of the present disclosure. As illustrated in FIG. 5, the device 500 includes a communication module 510 and a processing module 520. The communication module 510 is configured to receive retransmission scheduling of a first HARQ process performed by a network device. The processing module 520 is configured to process deprioritized data according to first information. The deprioritized data corresponds to the first HARQ process, and the first information includes at least one of: whether the deprioritized data is assembled before the retransmission scheduling is received, or whether the deprioritized data is delivered to the first HARQ process before the retransmission scheduling is received.

Alternatively, in some implementations, the processing module 520 is configured to assemble the deprioritized data on condition that the deprioritized data is not assembled before the retransmission scheduling is received, and trigger usage of the first HARQ process to perform new transmission of the deprioritized data.

Alternatively, in some implementations, the processing module 520 is configured to trigger, according to whether the deprioritized data is delivered to the first HARQ process before the retransmission scheduling is received, usage of the first HARQ process to perform new transmission of the deprioritized data or retransmit the deprioritized data, on condition that the deprioritized data is assembled before the retransmission scheduling is received.

Alternatively, in some implementations, the processing module 520 is configured to trigger usage of the first HARQ process to perform new transmission of the deprioritized data, on condition that the deprioritized data is not delivered to the first HARQ process before the retransmission scheduling is received.

Alternatively, in some implementations, the processing module 520 is configured to trigger usage of the first HARQ process to retransmit the deprioritized data, on condition that the deprioritized data is delivered to the first HARQ process before the retransmission scheduling is received.

Alternatively, in some implementations, the processing module 520 is configured to perform at least one of: acquiring the deprioritized data assembled; delivering to the first HARQ process at least one of the deprioritized data assembled, uplink grant for the retransmission scheduling, or HARQ information for the uplink grant; or instructing the first HARQ process to perform new transmission of the deprioritized data assembled.

Alternatively, in some implementations, the processing module 520 is configured to perform at least one of: delivering to the first HARQ process uplink grant for the retransmission scheduling and/or HARQ information for the uplink grant, or instructing the first HARQ process to retransmit the deprioritized data assembled.

Alternatively, in some implementations, the processing module 520 is configured to start or restart a configured grant timer for the first HARQ process in response to starting to transmit the deprioritized data, on condition that the first HARQ process is an HARQ process for a configured grant resource.

Alternatively, in some implementations, the processing module 520 is configured to determine that the first HARQ process is the HARQ process for the configured grant resource on condition that the retransmission scheduling is scheduled by a PDCCH scrambled by a CS-RNTI, or determine that the first HARQ process is the HARQ process for the configured grant resource, on condition that the retransmission scheduling is scheduled by a PDCCH scrambled by a C-RNTI and the first HARQ process is an HARQ process for a corresponding configured grant resource.

Alternatively, in some implementations, the processing module 520 is further configured to determine whether to assemble the deprioritized data according to second information, before the communication module receives the retransmission scheduling of the first HARQ process performed by the network device. The second information includes at least one of: whether prioritized data corresponding to the deprioritized data is assembled, whether the prioritized data is transmitted to a physical layer, whether the prioritized data is transmitted, a priority of the deprioritized data, or a priority of a first grant resource for the deprioritized data. The first grant resource is available for transmitting the deprioritized data before the terminal device receives the retransmission scheduling.

Alternatively, in some implementations, the processing module 520 is configured to skip assembling the deprioritized data in response to at least one of the following conditions being satisfied: the prioritized data is assembled before a first time point, and the priority of the deprioritized data is lower than a priority of the prioritized data; the prioritized data is assembled before the first time point, and the priority of the first grant resource is lower than a priority of a grant resource for the prioritized data; the prioritized data is transmitted to a physical layer before the first time point, and the priority of the deprioritized data is lower than the priority of the prioritized data; the prioritized data is transmitted to the physical layer before the first time point, and the priority of the first grant resource is lower than the priority of the grant resource for the prioritized data; the prioritized data is transmitted before the first time point, and the priority of the deprioritized data is lower than the priority of the prioritized data; the prioritized data is transmitted before the first time point, and the priority of the first grant resource is lower than the priority of the grant resource for the prioritized data; an SR is transmitted to the physical layer before the first time point, and the priority of the deprioritized data is lower than a priority of the SR; the SR is transmitted to the physical layer before the first time point, and the priority of the first grant resource is lower than a priority of a grant resource for the SR; the SR is transmitted before the first time point, and the priority of the deprioritized data is lower than the priority of the SR; or, the SR is transmitted before the first time point, and the priority of the first grant resource is lower than the priority of the grant resource for the SR. "Before the first time point" includes at least one of: before the terminal device receives the first grant resource configured by the network device, before a start time-domain position of the first grant resource, or before to-be-transmitted data occurs on the first grant resource.

Alternatively, in some implementations, the processing module 520 is configured to skip delivering to an HARQ process for a first grant resource the deprioritized data and/or a first grant resource for transmitting the deprioritized data, in the case of skipping assembling the deprioritized data; and/or skipping instructing, at an MAC layer, the physical layer to use the first grant resource to transmit the deprioritized data, in the case of skipping assembling the deprioritized data, where the first grant resource is available for transmitting the deprioritized data before the device receives the retransmission scheduling.

Alternatively, in some implementations, the processing module 520 is configured to assemble the deprioritized data in response to at least one of the following conditions being satisfied: the prioritized data is assembled before a second time point, and the priority of the deprioritized data is lower than the priority of the prioritized data; the prioritized data is assembled before the second time point, and the priority of the first grant resource is lower than a priority of a grant resource for the prioritized data; the prioritized data is transmitted to the physical layer before the second time point, and the priority of the deprioritized data is lower than the priority of the prioritized data; the prioritized data is transmitted to the physical layer before the second time point, and the priority of the first grant resource is lower than the priority of the grant resource for the prioritized data; the prioritized data is transmitted before the second time point, and the priority of the deprioritized data is lower than the priority of the prioritized data; the prioritized data is transmitted before the second time point, and the priority of the first grant resource is lower than the priority of the grant resource for the prioritized data; an SR is transmitted to the physical layer before the second time point, and the priority of the deprioritized data is lower than a priority of the SR; the SR is transmitted to the physical layer before the second time point, and the priority of the first grant resource is lower than a priority of a grant resource for the SR; the SR is transmitted before the second time point, and the priority of the deprioritized data is lower than the priority of the SR; or the SR is transmitted before the second time point, and the priority of the first grant resource is lower than the priority of the grant resource for the SR. "Before the second time point" includes at least one of: before the device receives the first grant resource configured by the network device; before a start time-domain position of the first grant resource; or before to-be-transmitted data occurs on the first grant resource.

Alternatively, in some implementations, the processing module 520 is further configured to skip delivering to the HARQ process for the first grant resource the deprioritized data and/or the first grant resource for transmitting the deprioritized data, in the case of assembling the deprioritized data; and/or skip instructing, at the MAC layer, the physical layer to use the first grant resource to transmit the prioritized data, in the case of assembling the deprioritized data. The first grant resource is available for transmitting the deprioritized data before the device receives the retransmission scheduling.

Alternatively, in some implementations, the communication module is configured to receive an uplink grant scheduled by a PDCCH scrambled by a CS-RNTI, where an NDI in the PDCCH is 1, and an HARQ process for the uplink grant is the first HARQ process.

Alternatively, in some implementations, the communication module is configured to receive an uplink grant scheduled by a PDCCH scrambled by a C-RNTI, where an HARQ process for the uplink grant is the first HARQ process.

Alternatively, in some implementations, the processing module 520 is configured to determine whether the deprioritized data is assembled according to at least one of: whether a buffer of the first HARQ process is empty; whether the deprioritized data is stored in the buffer of the first HARQ process; or whether a grant resource for the deprioritized data is used before the retransmission scheduling is received.

Alternatively, in some implementations, the processing module 520 is further configured to determine that the deprioritized data is not assembled, on condition that the buffer of the first HARQ process is empty; determine that the deprioritized data is not assembled, on condition that the deprioritized data is not stored in the buffer of the first HARQ process; determine that the deprioritized data is not assembled, on condition that the grant resource for the deprioritized data is not used before the retransmission scheduling is received; determine that the deprioritized data is assembled, on condition that the buffer of the first HARQ process is not empty; determine that the deprioritized data is assembled, on condition that the deprioritized data is stored in the buffer of the first HARQ process; or determine that the deprioritized data is assembled, on condition that the grant resource for the deprioritized data is used before the retransmission scheduling is received.

Alternatively, in some implementations, the communication module may be a communication interface or a transceiver, or a communication chip or an input and output interface of a system on chip (SOC). The above processing module may be one or more processors.

It is to be understood that the device 500 according to implementations of the present disclosure may correspond to the terminal device in the method implementations of the present disclosure. The above and other operations and/or functions performed by various units in the device 500 respectively realize corresponding procedures performed by the terminal device in the method 200 illustrated in FIG. 2, which will not be repeated herein for the purpose of brevity.

Figure 6:
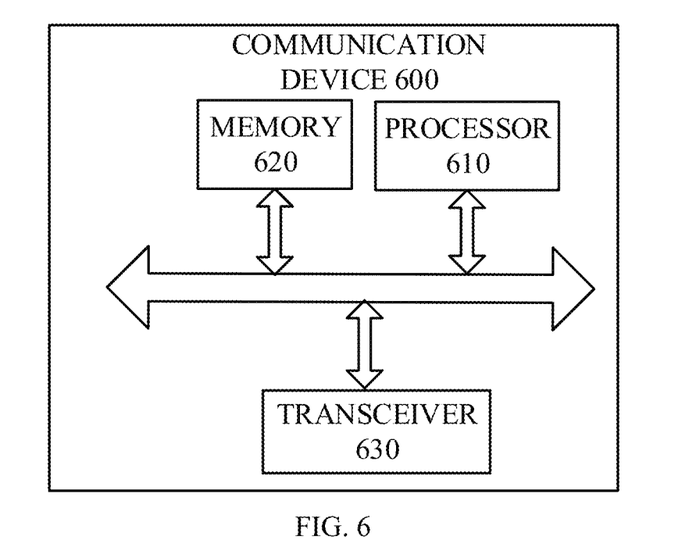
FIG. 6 is a schematic block diagram illustrating a comunication device provided in other implementations of the present disclosure.

FIG. 6 is a schematic structure diagram illustrating a communication device 600 provided in implementations of the present disclosure. The communication device 600 illustrated in FIG. 6 includes a processor 610. The processor 610 can invoke and execute the computer programs stored in the memory, to perform the methods in the implementations of the present disclosure.

Alternatively, as illustrated in FIG. 6, the device 600 further includes a memory 620. The processor 610 can invoke and execute the computer programs stored in the memory 620, to perform the methods in the implementations of the present disclosure.

The memory 620 may be a separate device from the processor 610, or be integrated into the processor 610.

Alternatively, as illustrated in FIG. 6, the communication device 600 may further include a transceiver 630. The processor 610 can control the transceiver 630 to communicate with other devices, for example, transmit information or data to other devices, or receive information or data transmitted by other devices.

The transceiver 630 may include a transmitter and a receiver. The transceiver may further include one or more antennas.

Alternatively, the device 600 may be the network device in the implementations of the present disclosure, and the communication device 600 can implement a corresponding process implemented by the communication device 600 in each of the methods in the implementations of the present disclosure, which will not be repeated herein for the sake of simplicity.

Alternatively, the device 600 may be the mobile terminal/terminal device in the implementations of the present disclosure, and the device 600 can implement a corresponding process implemented by the mobile terminal/terminal device in each of the methods in the implementations of the present disclosure, which will not be repeated herein for the sake of simplicity.

Figure 7:
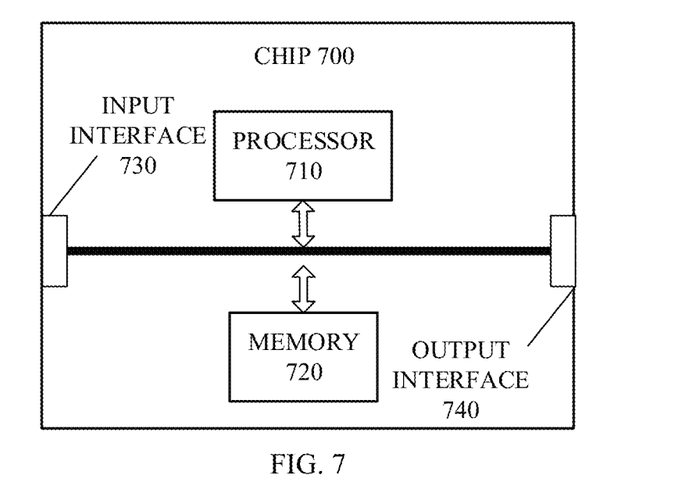
FIG. 7 is a schematic diagram illustrating a chip provided in implementations of the present disclosure.

FIG. 7 is a schematic structure diagram illustrating a chip according to implementations of the present disclosure. The chip 700 illustrated in FIG. 7 includes a processor 710. The processor 710 can invoke and execute the computer programs stored in the memory, to perform the methods in the implementations of the present disclosure.

Alternatively, as illustrated in FIG. 7, the chip 700 may further include a memory 720. The processor 710 can invoke and execute the computer programs stored in the memory 720, to perform the methods in the implementations of the present disclosure.

The memory 720 may be a separate device from the processor 710, or be integrated into the processor 710.

Alternatively, the chip 700 may further include an input interface 730. The processor 710 can control the input interface 730 to communicate with other devices or chips, specifically, obtain information or data transmitted by other devices or chips.

Alternatively, the chip 700 may further include an output interface 740. The processor 710 can control the output interface 740 to communicate with other devices or chips, specifically, output information or data to other devices or chips.

Alternatively, the chip 700 can be applied to the network device in the implementations of the present disclosure, and the chip can implement a corresponding process implemented by the network device in each of the methods in the implementations of the present disclosure, which will not be repeated herein for the sake of simplicity.

Alternatively, the chip can be applied to the mobile terminal/terminal device in the implementations of the present disclosure, and the chip can implement a corresponding process implemented by the mobile terminal/terminal device in each of the methods in the implementations of the present disclosure, which will not be repeated herein for the sake of simplicity.

It can be understood that the chip may be a system-level chip, a system chip, a chip system, an SoC chip, or the like.

It can be understood that the processor in the implementations of the present disclosure may be an integrated circuit chip with signal processing capabilities. During implementation, each step of the foregoing methods may be completed by an integrated logic circuit in the form of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in the implementations of the present disclosure can be implemented or executed. The general purpose processor may be a microprocessor, or the processor may be any typical processor or the like. The steps of the method disclosed in the implementations of the present disclosure may be directly implemented as a hardware decoding processor, or may be performed by hardware and software modules in the decoding processor. The software module can be located in a storage medium such as a random access memory (RAM), a flash memory, a read only memory (ROM), a programmable read-only memory (PROM,) or an electrically erasable programmable memory, registers, or the like. The storage medium is located in the memory. The processor reads the information in the memory, and completes the steps of the above-mentioned method with the hardware thereof.

It can be understood that in implementations of the present disclosure, the memory may be a volatile memory or a non-volatile memory, or may include both the volatile memory and the non-volatile memory. The non-volatile memory may be a ROM, a PROM, an erasable programmable read-only memory (EPROM), an electrically erasable programmable read-only memory (EEPROM), or a flash memory. The volatile memory can be a RAM that acts as an external cache. By way of example but not limitation, many forms of RAM are available, such as a static random access memory (SRAM), a dynamic random access memory (DRAM), a synchronous dynamic random access memory (SDRAM), a double data rate SDRAM (DDRSDRAM), an enhanced SDRAM (ESDRAM), a synclink dynamic random access memory (SLDRAM), and a direct rambus random access memory (DR RAM). It is to be noted that the memory described herein is intended to include, but is not limited to, these and any other suitable types of memory.

It is to be understood that the above-mentioned memory is an example but not limitation. For example, the memory in the implementations of the present disclosure may be an SRAM, a DRAM, an SDRAM, a DDR SDRAM, an ESDRAM, an SLDRAM, and a DR RAM. That is, the memory described herein is intended to include, but is not limited to, these and any other suitable types of memory.

A computer-readable storage medium is provided according to implementations of the present disclosure. The computer-readable storage medium is configured to store a computer program.

Alternatively, the computer-readable storage medium may be applied to the network device in implementations of the present disclosure, and the computer program enables a computer to perform a corresponding process implemented by the network device in each of the methods in the implementations of the present disclosure, which will not be repeated herein for the sake of simplicity.

Alternatively, the computer-readable storage medium may be applied to the mobile terminal/terminal device in the implementations of the present disclosure, and the computer program enables a computer to perform a corresponding process implemented by the mobile terminal/terminal device in each of methods in the implementations of the present disclosure, which will not be repeated herein for the sake of simplicity.

A computer program product is provided according to implementations of the present disclosure. The computer program product includes computer program instructions.

Alternatively, the computer program product may be applied to the network device in the implementations of the present disclosure, and the computer program instructions enable a computer to perform a corresponding process implemented by the mobile terminal/terminal device in each of the methods in the implementations of the present disclosure, which will not be repeated herein for the sake of simplicity.

Alternatively, the computer program product may be applied to the mobile terminal/terminal device in the implementations of the present disclosure, and the computer program instructions enable a computer to perform a corresponding process implemented by the mobile terminal/terminal device in each of the methods in the implementations of the present disclosure, which will not be repeated herein for the sake of simplicity.

A computer program is provided according to implementations of the present disclosure.

Alternatively, the computer program may be applied to the network device in the implementations of the present disclosure, and the computer program, when running on a computer, causes the computer to perform a corresponding process implemented by the network device in each of the methods of the implementations of the present disclosure, which will not be repeated herein for the sake of simplicity.

Alternatively, the computer program may be applied to the mobile terminal/terminal device in the implementations of the present disclosure. The computer program, when running on a computer, enables the computer to perform a corresponding process implemented by the mobile terminal/terminal device in each of the methods in the implementations of the present disclosure, which will not be repeated herein for the sake of simplicity.

Those of ordinary skill in the art can appreciate that units and algorithmic operations of various examples described in connection with the implementations herein can be implemented by electronic hardware or by a combination of computer software and electronic hardware. Whether these functions are performed by means of hardware or software depends on particular application and design constraints of the technical solution. Those skilled in the art may use different methods with regard to each particular application to implement the described functionality, but such methods should not be regarded as lying beyond the scope of the present disclosure.

It may be evident to those skilled in the art that, for the sake of convenience and simplicity, in terms of the working processes of the foregoing systems, apparatuses, and units, reference can be made to the corresponding processes of the above-mentioned method implementations, which will not be repeated herein.

It may be appreciated that the systems, apparatuses, and methods disclosed in the implementations of the present disclosure may also be implemented in various other manners. For example, the above-mentioned apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, devices or units, and may be electrical, mechanical, or otherwise.

Separated units as illustrated may or may not be physically separated. Components or parts displayed as units may or may not be physical units, and may reside at one location or may be distributed to multiple networked units. Some of or all the units may be selectively adopted according to practical needs to achieve desired objectives of the present disclosure.

In addition, various functional units described in the implementations herein may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the technical solution, or the portion that contributes to the prior art, or all or part of the technical solution of the present disclosure may be embodied as software products. The computer software products can be stored in a storage medium and may include multiple instructions that, when executed, can cause a computing device, e.g., a personal computer, a server, a network device, etc., to execute some or all operations of the methods described in the implementations of the present disclosure. The above-mentioned storage medium may include various kinds of medium that can store program codes, such as a universal serial bus (USB) flash disk, a mobile hard drive, a ROM, a RAM, a magnetic disk, or an optical disk.

The above is only a specific implementation of the present disclosure and is not intended to limit the scope of protection of the present disclosure. Any modification and replacement made by those skilled in the art within the technical scope of the present disclosure shall be included in the scope of protection of the present disclosure. Therefore, the scope of protection of the present disclosure should be stated in the scope of protection of the claims.

What is claimed is:

1. A method for wireless communication, comprising:
    receiving, by a terminal device, retransmission scheduling of a first hybrid automatic repeat request (HARQ) process performed by a network device; and
    processing, by the terminal device, deprioritized data according to first information, the deprioritized data corresponding to the first HARQ process, and the first information comprising at least one of:
        whether the deprioritized data is assembled before the retransmission scheduling is received; or
        whether the deprioritized data is delivered to the first HARQ process before the retransmission scheduling is received;
    wherein processing, by the terminal device, the deprioritized data according to the first information, comprises:
        assembling the deprioritized data on condition that the deprioritized data is not assembled before the retransmission scheduling is received; and
        triggering usage of the first HARQ process to perform new transmission of the deprioritized data.

2. The method of claim 1, wherein processing, by the terminal device, the deprioritized data according to the first information, comprises:
    on condition that the deprioritized data is assembled before the retransmission scheduling is received,
    triggering, according to whether the deprioritized data is delivered to the first HARQ process before the retransmission scheduling is received, usage of the first HARQ process to perform new transmission of the deprioritized data or retransmit the deprioritized data.

3. The method of claim 2, wherein triggering, according to whether the deprioritized data is delivered to the first HARQ process before the retransmission scheduling is received, usage of the first HARQ process to perform new transmission of the deprioritized data or retransmit the deprioritized data, comprises:
    triggering the usage of the first HARQ process to perform new transmission of the deprioritized data, on condition that the deprioritized data is not delivered to the first HARQ process before the retransmission scheduling is received.

4. The method of claim 2, wherein triggering, according to whether the deprioritized data is delivered to the first HARQ process before the retransmission scheduling is received, usage of the first HARQ process to perform new transmission of the deprioritized data or retransmit the deprioritized data, comprises:
    triggering the usage of the first HARQ process to retransmit the deprioritized data, on condition that the deprioritized data is delivered to the first HARQ process before the retransmission scheduling is received.

5. The method of claim 1, wherein triggering usage of the first HARQ process to perform new transmission of the deprioritized data comprises at least one of:
    acquiring the deprioritized data assembled;
    delivering to the first HARQ process at least one of the deprioritized data assembled, uplink grant for the retransmission scheduling, or HARQ information for the uplink grant; or
    instructing the first HARQ process to perform new transmission of the deprioritized data assembled.

6. The method of claim 1, further comprising:
    on condition that the first HARQ process is an HARQ process for a configured grant resource,
    starting or restarting a configured grant timer for the first HARQ process in response to starting to transmit the deprioritized data.

7. The method of claim 1, further comprising:
    prior to receiving, by the terminal device, the retransmission scheduling of the first HARQ process performed by the network device,
    determining, by the terminal device, whether to assemble the deprioritized data according to second information, the second information comprising at least one of:
        whether prioritized data corresponding to the deprioritized data is assembled, whether the prioritized data is transmitted to a physical layer, whether the prioritized data is transmitted, a priority of the deprioritized data, or a priority of a first grant resource for the deprioritized data, the first grant resource being available for transmitting the deprioritized data before the terminal device receives the retransmission scheduling.

8. The method of claim 1, further comprising:
skipping delivering, by the terminal device, to an HARQ process for a first grant resource the deprioritized data and/or a first grant resource for transmitting the deprioritized data, in a case of skipping assembling the deprioritized data; and/or
skipping instructing, by a medium access control (MAC) layer of the terminal device, a physical layer to use the first grant resource to transmit the deprioritized data, in the case of skipping assembling the deprioritized data;
wherein the first grant resource is available for transmitting the deprioritized data before the terminal device receives the retransmission scheduling.

9. The method of claim 1, further comprising:
skipping delivering, by the terminal device, to an HARQ process for a first grant resource the deprioritized data and/or the first grant resource for transmitting the deprioritized data, in a case of assembling the deprioritized data; and/or
skipping instructing, by an MAC layer of the terminal device, a physical layer to use the first grant resource to transmit the deprioritized data, in the case of assembling the deprioritized data;
wherein the first grant resource is a grant resource available for transmitting the deprioritized data before the terminal device receives the retransmission scheduling.

10. The method of claim 1, wherein receiving, by the terminal device, the retransmission scheduling of the first HARQ performed by the network device, comprises:
receiving, by the terminal device, an uplink grant scheduled by a PDCCH scrambled by a CS-RNTI, wherein a new data indicator (NDI) in the PDCCH is 1, and an HARQ process for the uplink grant is the first HARQ process.

11. The method of claim 1, wherein receiving, by the terminal device, the retransmission scheduling of the first HARQ performed by the network device, comprises:
receiving, by the terminal device, an uplink grant scheduled by a PDCCH scrambled by a C-RNTI, wherein an HARQ process for the uplink grant is the first HARQ process.

12. The method of claim 1, further comprising:
determining, by the terminal device, whether the deprioritized data is assembled according to at least one of:
whether a buffer of the first HARQ process is empty;
whether the deprioritized data is stored in the buffer of the first HARQ process; or
whether a grant resource for the deprioritized data is used before the retransmission scheduling is received.

13. A terminal device, comprising:
a transceiver;
a processor; and
a memory storing a computer program which, when executed by the processor, causes the transceiver to receive retransmission scheduling of a first hybrid automatic repeat request (HARQ) process performed by a network device; and
the computer program, when executed by the processor, further causing the processor to process deprioritized data according to first information, the deprioritized data corresponding to the first HARQ process, and the first information comprising at least one of:
whether the deprioritized data is assembled before the retransmission scheduling is received; or
whether the deprioritized data is delivered to the first HARQ process before the retransmission scheduling is received;
wherein the computer program, when executed by the processor, further causes the processor to trigger, according to whether the deprioritized data is delivered to the first HARQ process before the retransmission scheduling is received, usage of the first HARQ process to perform new transmission of the deprioritized data or retransmit the deprioritized data, on condition that the deprioritized data is assembled before the retransmission scheduling is received.

14. The terminal device of claim 13, wherein the computer program, when executed by the processor, further causes the processor to:
assemble the deprioritized data on condition that the deprioritized data is not assembled before the retransmission scheduling is received; and
trigger usage of the first HARQ process to perform new transmission of the deprioritized data.

15. The terminal device of claim 14, wherein the computer program, when executed by the processor, further causes the processor to determine whether to assemble the deprioritized data according to second information, before the retransmission scheduling of the first HARQ process performed by the network device is received, wherein the second information comprises at least one of: whether prioritized data corresponding to the deprioritized data is assembled, whether the prioritized data is transmitted to a physical layer, whether the prioritized data is transmitted, a priority of the deprioritized data, or a priority of a first grant resource for the deprioritized data, wherein the first grant resource is available for transmitting the deprioritized data before the device receives the retransmission scheduling.

16. The terminal device of claim 13, wherein the computer program, when executed by the processor, further causes the transceiver to skip delivering to an HARQ process for a first grant resource the deprioritized data and/or a first grant resource for transmitting the deprioritized data, in a case of skipping assembling the deprioritized data; and/or
the computer program, when executed by the processor, further causes the processor to skip instructing, at a medium access control (MAC) layer, a physical layer to use the first grant resource to transmit the deprioritized data, in the case of skipping assembling the deprioritized data;
wherein the first grant resource is available for transmitting the deprioritized data before the device receives the retransmission scheduling.

17. The terminal device of claim 13, wherein the computer program, when executed by the processor, further causes the transceiver to skip delivering to an HARQ process for a first grant resource the deprioritized data and/or the first grant resource for transmitting the deprioritized data, in the case of assembling the deprioritized data; and/or
the computer program, when execute by the processor, further causes the processor to skip instructing, at an MAC layer, a physical layer to use the first grant resource to transmit the deprioritized data, in a case of assembling the deprioritized data;
wherein the first grant resource is available for transmitting the deprioritized data before the device receives the retransmission scheduling.

18. A non-transitory computer-readable storage medium configured to store one or more programs comprising instructions which cause a terminal device to:

receive retransmission scheduling of a first hybrid automatic repeat request (HARQ) process performed by a network device; and process deprioritized data according to first information, the deprioritized data corresponding to the first HARQ process, and the first information comprising at least one of:
  whether the deprioritized data is assembled before the retransmission scheduling is received; or
  whether the deprioritized data is delivered to the first HARQ process before the retransmission scheduling is received;

the instructions further causing the terminal device to start or restart, on condition that the first HARQ process is an HARQ process for a configured grant resource, a configured grant timer for the first HARQ process in response to starting to transmit the deprioritized data.

* * * * *